Nov. 29, 1966  A. SHOTWELL  3,288,233
REMOTELY CONTROLLED ELECTRICALLY PROPELLED VEHICLE
Filed Oct. 8, 1964  3 Sheets-Sheet 1

INVENTOR.
Allen Shotwell
BY
Frease, Bishop, Johns & Schick
ATTORNEYS

Nov. 29, 1966 A. SHOTWELL 3,288,233
REMOTELY CONTROLLED ELECTRICALLY PROPELLED VEHICLE
Filed Oct. 8, 1964 3 Sheets-Sheet 2

INVENTOR.
Allen Shotwell
BY
Frease, Bishop, Johns & Schick
ATTORNEYS

Nov. 29, 1966   A. SHOTWELL   3,288,233
REMOTELY CONTROLLED ELECTRICALLY PROPELLED VEHICLE
Filed Oct. 8, 1964   3 Sheets-Sheet 3
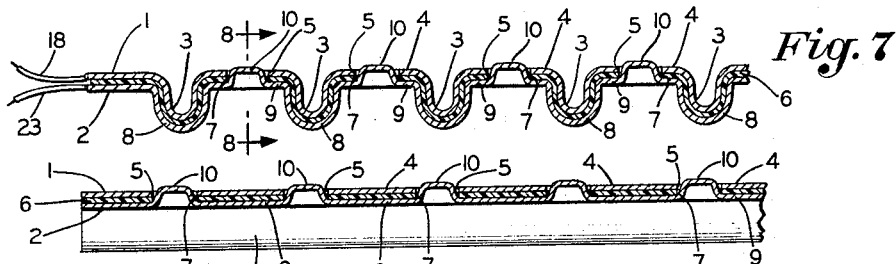
*Fig. 7*
*Fig. 8*
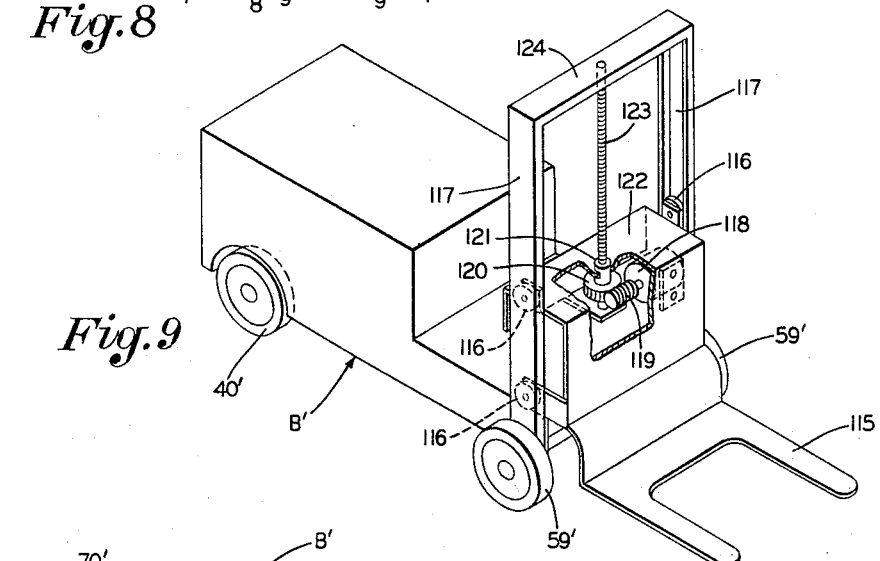
*Fig. 9*
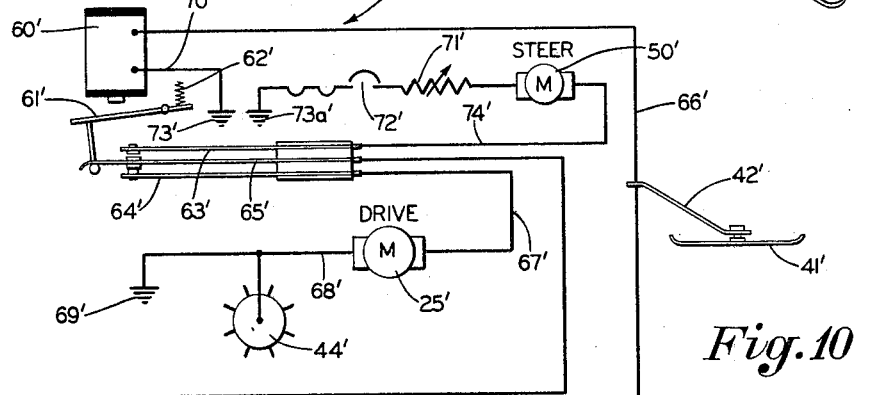
*Fig. 10*
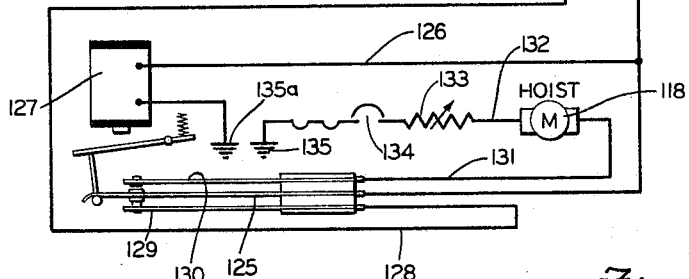
INVENTOR.
*Allen Shotwell*
BY
*Frease, Bishop, Johns & Schick*
ATTORNEYS

United States Patent Office 3,288,233
Patented Nov. 29, 1966

3,288,233
REMOTELY CONTROLLED ELECTRICALLY
PROPELLED VEHICLE
Allen Shotwell, 207 Simpson Howell Road,
Elizabeth, Pa.
Filed Oct. 8, 1964, Ser. No. 402,428
11 Claims. (Cl. 180—2)

The invention relates to remotely controlled vehicles and electric control means therefor, and more particularly to improvements upon such devices as disclosed in my prior Patents No. 2,768,697, dated October 30, 1956, and No. 2,832,427, dated April 29, 1958.

Although the devices of said prior patents are operational, it has been found that there are several features of the same which can be improved. For instance, the vehicle is slow in response, there is excess weight on the steering wheels, rectifiers are required which add to the cost of the vehicle, the fifth wheel type of steering gives an unrealistic appearance, but most important of all, no reverse is provided.

A primary object of the invention is to provide remote control means which corrects the above and other defects in the construction of said prior patents.

Another object of the invention is to provide remote control means of the character referred to in which the vehicle will respond quickly.

A further object of the invention is to provide such a remote control means in which a direct current motor is coupled mechanically to an automotive type steering means.

A still further object of the invention is to provide remote control means of this type in which reversing means is provided.

It is also an object of the invention to provide remote control means of the character referred to in which the vehicle is provided with a driving motor and a steering motor, both of which are D.C. motors, the driving motor requiring less voltage than a relay in the steering motor circuit, the steering control being arranged to interrupt the normal drive motor current to the track and inject a higher voltage, which energizes the relay magnet in the vehicle breaking the circuit to the drive motor and connecting the steering motor.

Another object of the invention is to provide such a remote control means in which more than one relay may be provided in the vehicle circuit to animate the vehicle or its equipment, each relay responding to its own voltage to connect its own device in circuit while interrupting all others.

A further object of the invention is to provide control means of the type referred to in which a centrifugal clutch is incorporated in the drive means for the vehicle for automatically connecting a fly wheel whenever the drive motor speed is sufficient, permitting the vehicle to continue to be inertia propelled when the drive motor is disconnected from the circuit.

The above and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings, in which:

FIG. 7 is an enlarged fragmentary sectional view of a preferred form of track;

FIG. 8 is a section through the modified plaftorm or track taken as on the line 8—8, FIG. 7;

FIG. 9 is a perspective view of a modified form of vehicle having a hoist device having a relay adapted to be operated by a higher voltage than the steering motor relay; and FIG. 10 is a diagrammatic view of the circuit for the vehicle shown in FIG. 9.

Figure 1:
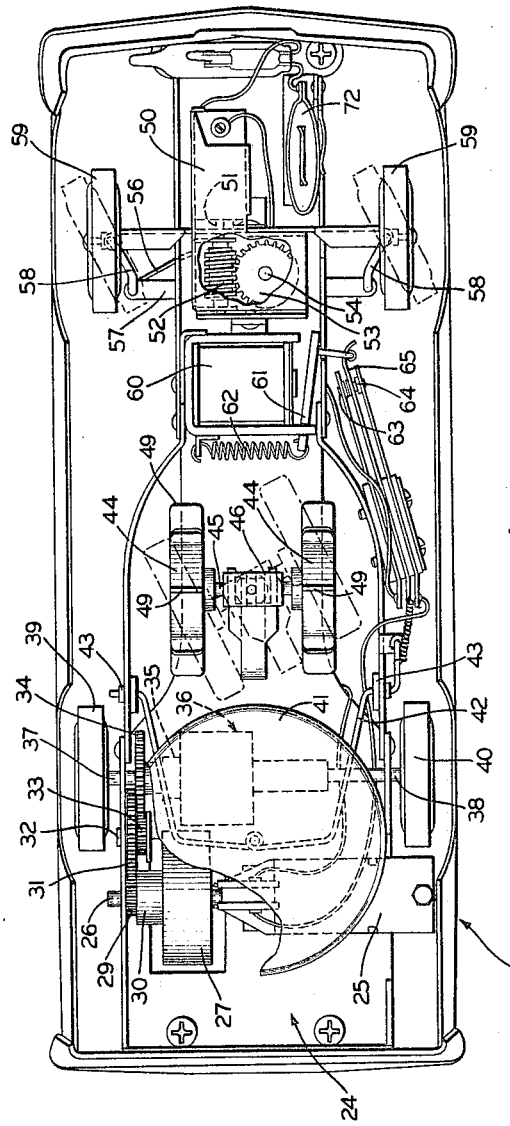
FIG. 1 is a bottom plan view of a vehicle embodying the invention.
Figure 3:
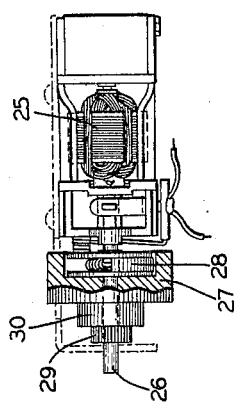
FIG. 3 is a detail sectional elevation of the centrifugal clutch.
Figure 2:
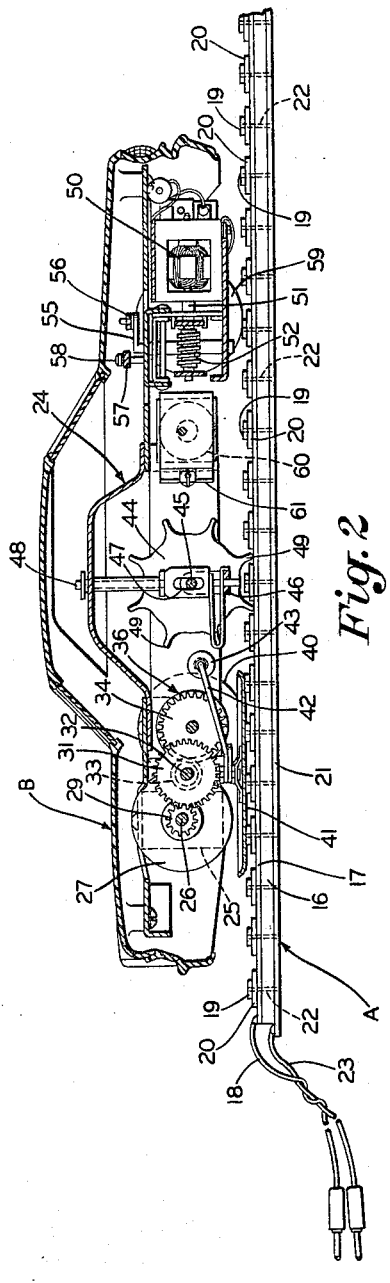
FIG. 2 is a longitudinal sectional view through the vehicle shown in FIG. 1.
Figure 4:
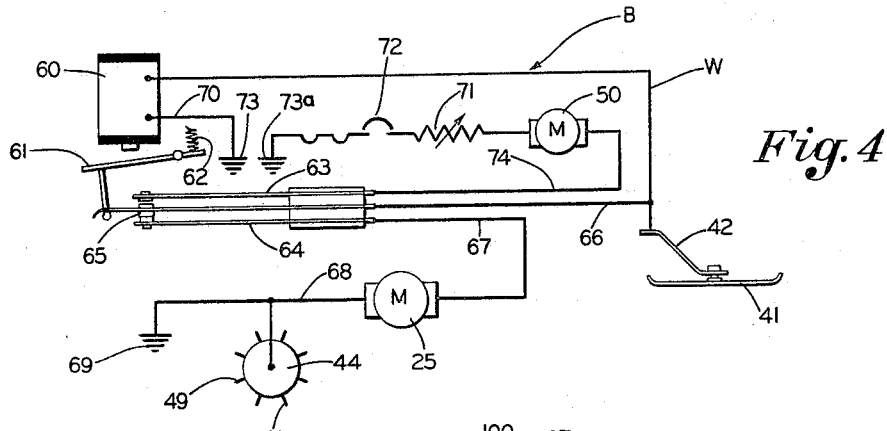
FIG. 4 is a diagrammatic view of the electric circuit in the vehicle shown in FIGS. 1 and 2.
Figure 6:
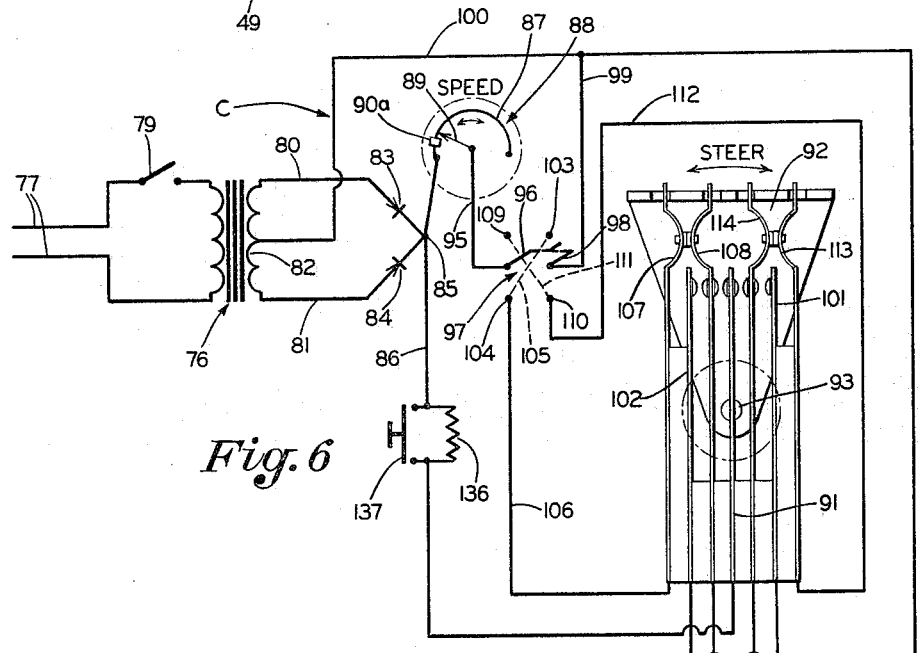
FIG. 6 is a diagrammatic view of the circuit in the remote control device shown in FIG. 5.
Figure 5:
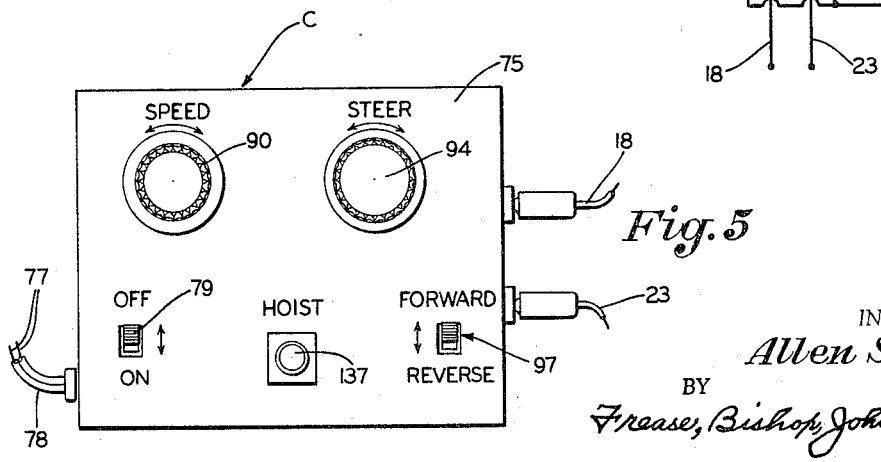
FIG. 5 is a plan view of the remote control device.

Referring first to the embodiment of the invention shown in FIGS. 1 to 6, the mechanism comprising the invention consists of substantially three main units, namely the conductor platform or track, indicated generally at A in FIG. 2, the electrically propelled vehicle, indicated generally at B in FIGS. 1, 2 and 4, and the remote control device, indicated generally at C in FIGS. 5 and 6.

Although the platform or track A as shown in FIG. 2 may be of the type disclosed in my prior Patent No. 2,768,697, it is preferred that a modification of the track or platform shown in my prior Patent No. 2,832,427 be used in the improved vehicle.

The section of such a platform or track is shown in FIGS. 7 and 8. This track is made up of two metal sheets, indicated at 1 and 2, which may be formed of any suitable metal providing a good electric conductor. The upper sheet 1 is provided with spaced parallel grooves 3, of suitable depth and spacing for receiving the teeth of the pick-up wheel in the vehicle, as will be later described.

Each of the high portions 4 of the top sheet 1, between adjacent grooves 3, is provided with a plurality of spaced openings 5 as best shown in FIG. 8. The metal top sheet 1 is insulated from the metal bottom sheet 2 as by a layer of insulation material 6 having openings 7 therein corresponding to the openings 5 in the top sheet 1.

The lower conductor sheet 2 may be provided with parallel grooves 8 to receive the grooves 3 of the top sheet 1 and with intervening high portions 9. Projections 10 are formed upon the high portions 9 of the lower conductor sheet, the spacing of the same being the same as the spacing of the aperture 5 in the upper sheet.

Thus, when the two conductor sheets 1 and 2 are assembled on the intermediate insulation sheet 6, the projections 10 of the lower conductor sheet 2 will extend through the openings 5 of the upper conductor sheet 1 and above the top surface of the high points 4 of said upper sheet 1.

This type of track or platform is preferred because the flat top surface 4 of the upper conductor sheet 1 may be coated for the purpose of insulating the same from the pick-up brush of the vehicle. Only the protruding projections 10 of the lower conductor sheet 2 will be engaged by the pick-up brush.

The teeth or spokes of the pick-up wheels will be received in the uncoated grooves 3 of the upper conductor sheet 1. This coating provides better traction and permits the designation of roads, attractive colors and the like upon the platform or track.

While the platform or track shown in FIGS. 7 and 8 is preferred for use with the improved remotely controlled vehicle to which the invention pertains, because of the small scale of the drawing in FIG. 2, the track or platform A is shown of the type disclosed in my Patent No. 2,768,697.

As described in said patent, the track or platform includes an insulation plate or block 16, of any desired length and width suitable for providing a table or platform upon which the remotely controlled, electrically propelled vehicle may operate. A conductor plate 17, of suitable conductor metal, may cover the entire top of the insulation block 16, and one wire 18 is connected to the conductor plate 17 and leads to the remote control device.

A spaced plurality of parallel conductor bars 19 are mounted above the conductor plate 17 and insulated therefrom by parallel strips 20 of insulation material. Each of the conductor bars 19 is connected to a buss bar 21, as by conductor wires 22 or their equivalents, insulated from the conductor plate 17, and a wire 23 is connected to the buss bar 21 and leads to the remote control device.

The electrically propelled vehicle indicated generally at B in FIGS. 1 and 2 includes a metal frame, indicated generally at 24, within the real portion of which is mounted the direct current drive motor 25. Upon the shaft 26 of the drive motor is rotatably mounted a fly wheel 27, adapted to be operatively connected to the shaft 26 by a conventional centrifugal clutch 28 when the motor 25 reaches sufficient speed.

A pinion 29 upon the hub 30 of the fly wheel 27 meshes with a gear 31 upon the counter-shaft 32. A pinion 33 upon said counter-shaft meshes with a gear 34 fixed upon the hub 35 of the conventional automatic type differential, indicated generally at 36, which is journalled upon the shafts 37 and 38 of the two drive wheels 39 and 40 of the vehicle.

As in my prior patents, the wheels of the vehicle are formed of suitable insulation material, preferably pliable rubber or the like, so as to insulate the vehicle from the conductors on the platform or track, except for the pick-ups, as in my prior patents.

A pick-up surface brush 41 is carried on the underside of the vehicle, for contact with the conductor bars 19, as shown in FIG. 2. This pick-up brush is carried by the bracket 42 pivotally mounted upon the frame and insulated therefrom as indicated at 43.

The toothed pick-up wheels 44 are both fixed upon an axle 45, journalled in a bracket 46, which is vertically adjustable, as indicated at 47, upon a rotatable vertical shaft 48. As best shown in FIG. 2, the teeth or sprockets 49 of the pick-up wheels contact the conductor plate 17 in the grooves formed by the adjacent insulation strips 20.

At the forward end of the vehicle is located a direct current steering motor 50, upon the shaft 51 of which is fixed a worm screw 52, meshing with a worm wheel 53, upon the vertical shaft 54. Upon the upper end of the shaft 54 is an arm 55 connected by link 56 to the bar 57, to opposite ends of which are pivotally connected the arms 58 forming a part of the steering knuckles of the front wheels 59. It should be understood that the front wheels are also provided with insulation tires of resilient rubber or the like. The relay magnet 60 has armature 61, which is normally held away from the magnet by the spring 62. The relay includes the fixed contacts 63 and 64 and the movable contact 65.

Referring to FIG. 4, showing the wiring diagram of the vehicle, the pick-up brush 41 is connected to conductor wire 66, one end of which is connected to the movable relay contact 65 and the other end to the relay magnet 60.

Contact 64 of the relay is connected by conductor wire 67 with one side of the driving motor 25. The other side of the driving motor is connected by conductor wire 68 to the pick-up wheels 49, and grounded upon the vehicle frame as at 69.

The relay magnet 60 is connected by conductor wire 70 to vehicle frame ground shown at 73. A conductor 74 connects one side of the steering motor to the relay contact 63. A variable resistor 71 is connected to the other side of motor 50 and grounded through circuit breaker 72 as at 73a.

The remote control device, shown in FIGS. 5 and 6, is mounted within a housing 75, within which is located a transformer, indicated generally at 76, adapted to be connected through the conductor wires 77 of a flexible cord 78 to a 110-volt circuit as by conventional connector plug. An off-and-on switch 79 is provided for controlling connection of the remote control device to the power circuit.

Conductor wires 80 and 81 are connected to opposite ends of the secondary winding 82 of the transformer 76 and rectifiers 83 and 84 are located in said conductor wires. Both of the wires 80 and 81 are connected through the rectifiers 83 and 84 at 85 to a conductor wire 86 connected at one end to a coil 87 of the rheostat, indicated generally at 88. The movable member 89 of the rheostat may be moved in an arc, as by the rotatable button 90 for controlling the speed of the vehicle. A stop 90a for the movable member 88 limits the voltage.

The other end of the conductor wire 86 is connected through resistor 136 if used to the flexible contact 91 of the steering control switch, which includes the insulation block 92 adapted to be oscillated about the center 93 as by the rotatable button 94.

The movable member 89 of the rheostat is connected by conductor wire 95 with one blade 96 of a double-pole, double-throw, reversing switch, indicated generally at 97. The other blade 98 of the switch 97 is connected by conductor wire 99 to the wire 100, one end of which is tapped from an intermediate point of the secondary winding 82 of the transformer and the other end of which is connected to the contacts 101 and 102.

The fixed contacts 103 and 104 of the double-pole, double-throw reversing switch 97 are connected as by the conductor 105, shown in dotted lines in FIG. 6, and a conductor wire 106 connects the same to the contact 107 of the steering switch, which is normally in contact with the contact 108 connected by the wire 18 to one conductor member of the track of platform, as shown in FIG. 2 or FIG. 8.

The contacts 109 and 110 of the reversing switch 97 are connected by the conductor 111, shown in dotted lines in FIG. 6, and are connected by the conductor wire 112 to the contact 113 of the steering switch, which normally contacts the contact 114, which is connected to the other wire 23 leading to the platform or track.

In FIGS. 9 and 10 are shown a modified form of vehicle which operates exactly the same and has the same steering and driving system as that shown in FIGS. 1 to 4, plus an additional relay requiring a higher voltage than that of the steering motor relay, to interrupt power to the drive and steering motors and direct power only to a hoist motor.

This vehicle is indicated generally at B' and has the driving wheels 40' and steering wheels 59', which may be as above described. This vehicle is shown as a fork-lift truck, having the lifting fork 115 provided with rollers 116 for vertical movement within the guide-ways 117.

A direct current hoist motor is indicated at 118 having the worm screw 119 upon the shaft thereof and meshing with the worm gear 120, the hub 121 of which is bolstered in the top 122 of the lift fork 115, and which is threaded upon the vertical screw 123, anchored at its upper end to the cross bar 124 connecting the upper ends of the guide-ways 117.

When power is applied to the motor 118, the worm screw 119 rotates the worm gear 120, causing the worm gear, motor 118 and lift member 115 to move up or down on the vertical screw 123. The wiring diagram shown in FIG. 10 includes the pick-up brush 41', connected by conductor 42' to the wire 66', one end of which is connected to the steering motor relay magnet 60', the other end being connected to the movable contact 125 of the hoist relay. A wire 126 connects wire 125 to the hoist relay magnet 127.

A conductor wire 128 connects the contact 129 of the hoist relay to the movable contact 65' of the steering motor relay, which is normally in contact with the contact 64' thereof. The latter contact is connected by conductor wire 67' to one side of the drive motor 25', the other side of which is connected by a conductor wire 68' with the pick-up wheels 44' of the vehicle, and which is grounded upon the frame as at 69'.

Contact 63' of the steering motor relay is connected by conductor wire 74' to one side of the steering motor 50'. Armature 61' of the steering motor relay is normally held away from the magnet 60' by spring 62' and adapted to raise the movable contact 65' into contact with the steering motor relay contact 63' when the relay magnet 60' is energized sufficiently.

Conductor wire 70' is connected at one end to the relay 60' and is grounded at 73'. To the other side of motor 50' is connected the variable resistor 71' which is grounded through the circuit breaker 72' at 73a'.

The contact 130 of the hoist relay is connected by conductor wire 131 with the hoist motor 118, and conductor wire 132 connects the hoist motor, through the variable resistor 133 and circuit breaker 134 to ground at 135. The relay magnet 127 is grounded upon the frame at 135a.

Referring again to FIG. 6, a resistor 136 is shown in the conductor wire 86, adapted to be momentarily shunted out by push button 137. This is required only when a vehicle with two relays, such as the hoist vehicle shown in FIGS. 9 and 10 is used.

By pressing the push button 137 the resistance 136 is shunted out and a stronger voltage is transmitted to the vehicle, energizing the hoist motor relay magnet 127 and interrupting the drive motor and steering motor, whereby the hoist motor 118 is operated to raise the lifting fork 115 as above described.

In the operation of the device, the vehicle B may be placed upon the platform or track A, as shown in FIG. 2, with the pick-up brush 41 contacting the upper conductor bars 19 and the spokes 49 of the pick-up wheels 44 contacting the conductor plate 17 as shown therein.

Or, where the track or platform shown in FIGS. 7 and 8 is used, the pick-up brush 41 of the vehicle will contact only the upwardly disposed projections 10 of the lower conductor plate 2, while the spokes of the pick-up wheels will engage in the grooves 3 of the upper conductor plate 1. The rubber tired wheels of the vehicle will ride upon the coated upper surfaces 4 of the upper plate 1.

Assuming that the wires 18 and 23 from the track or platform are connected to the remote control device shown in FIGS. 5 and 6, and that the wires 77 thereof are plugged into a base receptacle or the like, the device will be ready for operation. The on-and-off switch 79 is closed, the reverse switch 97 is moved to forward position, contacting the blades 96 and 98 thereof with the contacts 109 and 103 respectively, and the rotatable button 90 of the speed control rheostat is moved counter-clockwise, to move the movable member 89 of the rheostat 88 in a counter-clockwise direction producing sufficient voltage to operate the drive motor 25 in the vehicle.

The circuit will then be closed from the transformer through the conductor wires 80 and 81 and rectifiers 83 and 84, conductor wire 86, coil 87 and movable member 89 of rheostat 88, conductor 95, switch blade 96, contact 109, conductor 111, contact 110, conductor 112, contacts 113 and 114 of steering switch, and conductor wire 23 to conductor bars 19 of track A in FIG. 2, or conductor plate 2 of track in FIGS. 8 and 9.

From the conductor 100, tapped from an intermediate portion of the secondary winding 82 of the transformer 76, the circuit will lead through the wire 99, blade 98 of the reversing switch, contact 103, conductor 105, contact 104, conductor wire 106, contacts 107 and 108 of the steering switch, and through conductor wire 18 to the other conductor plate 17 of the track or platform A shown in FIG. 2, or the upper conductor plate 1 of the track shown in FIGS. 7 and 8.

The circuit will then be completed through the vehicle from the pick-up brush 41, which contacts the conductor bars 19 or porjections 10 as the case may be, through the conductor 42, wire 66, contacts 65 and 64, wire 67, drive motor 25, wire 68 and pick-up wheel 44 to the conductor plate 17 of FIG. 2, or the grooves 3 of the conductor plate 1 of FIGS. 7 and 8, as the case may be.

The driving motor 25 is thus operated in a direction to drive the vehicle forward upon the track, and as sufficient speed is picked up the centrifugal clutch 28 will operate to connect the flywheel 27, so that the vehicle may be propelled by intertia after the drive motor is cut off.

If it is desired to reverse the direction of the vehicle, the reversing switch 97 is moved to reverse position, the blades 96 contacting the contact 104 and the blade 98 contacting the contact 110.

The circuit from the transformer to the conductor plates or bars of the track or platform is thus reversed. The current from the transformer secondary 82 through the conductor wires 80 and 81, and rectifiers 83 and 84, conductor 86, coil 87 and movable member 97 of rheostat 88, and conductor 95, and reversing switch blade 96 to contact 104 will pass through wire 106 to contacts 107 and 108 of steering switch to wire 18, while the current through the conductor wire 100, tapped from an intermediate point on the transformer secondary 82, will pass through 99, reversing switch blade 98, contact 110, wire 112 and contacts 113 and 114 of the steering switch to the other wire 23.

The circuit will thus be reversed through the driving motor 25 of the vehicle, driving the same in reverse, since it is a direct current motor, and thus causing the vehicle to move in reverse.

Assuming that the vehicle B is running forwardly upon the track or platform, in order to steer it, the steering button 94 (FIG. 5) will be oscillated in the proper direction to oscillate the insulation block 92 (FIG. 6) of the steering switch in the desired direction.

If the insulation block 92 is moved to the left, contact will be broken between 107 and 108, the latter contacting 102. In like manner, contact will be broken between 113 and 114, the latter contacting 91. The circuit to the track would then be from the transformer (FIG. 6) through rectifiers 83 and 84, through conductor wire 86 and resistor 136 if used to contact 91, to contact 114 and to track lead 23. The opposite side of the circuit would be from the transformer through wire 100, to contact 102 and contact 108 to track lead 18, completing both sides of the steering circuit to the track, subject to neither the rheostat 88 or reversing switch 97.

If the steering control button 94 is rotated in direction to move the insulating block 92 to the right, the result is the same circuit of reversed polarity at 18 and 23. Thus, the circuit is from the transformer through the rectifiers 83 and 84 through lead 86 and resistor 136 if used to contact 91, to contact 108, to track lead 18, and from transformer through wire 100, contact 101, contact 114 to track lead 23.

Within the vehicle, the steering control application delivers a voltage to the vehicle above the normal lower running current. This current from the pick-up brush 41, through conductor wire W (FIG. 4) to coil 60 of relay, and through wire 70 to ground on frame, and pick-up wheels 44 which are also frame-grounded, completing a circuit to the coil 60, which is already energized to some extent by current to the vehicle, but not sufficient to operate the same against the pull of the spring 62.

This higher voltage causes the relay 60 to respond, moving the armature 61 upward, breaking the connection between the contacts 65 and 64 and making connection between contacts 65 and 64 and making connection betwee contacts 65 and 63. The circuit is then from the pick-up brush 41 through conductor 42, wire 66, contact 65 to contact 63, wire 74 to steering motor 50, through variable resistor 71, which makes response of the motor 50 variable, and through circuit breaker 72 to ground on the frame at 73a, and through the frame-grounded pick-up wheels 44 to the track.

The direction of operation of this steering motor depends on the position to which the steering control, insulating block 92 is moved. Moving this insulation block to the left will produce one direction of steering and toward the right will produce another direction of steering, dependent on the polarity of current in relation to the steering motor 50.

Referring now to FIGS. 9 and 10, showing a vehicle with a second relay adapted to be energized by a higher voltage than necessary for the drive motor 25 or steering motor 50 to operate a third motor; as above stated the vehicle B' shown in FIG. 9 is adapted to be driven by the drive motor 25' and steered by the steering motor 50' in the same manner as the vehicle B illustrated and described above.

When the lifting forks or other mechanism controlled by the second relay, and operated by the third motor, is desired to be used, the push botton switch 137 (FIG. 6) may be closed, shunting out the resistor 136 and thus delivering higher voltage through the track leads 18 and 23 to the track or platform A, as shown in FIG. 2, or that shown in FIGS. 7 and 8, as the case may be.

With the push button switch 137 closed, the current to the relay magnet 127 is sufficient to cause the armature thereof to pull in, raising the movable contact 125, breaking contact of the same at 129 and making contact at 130, and through wire 131 hoist motor 118, lead 132, variable resistor 133, circuit breaker 134 to ground on frame of vehicle, and through frame to the pick-up wheels 44', which completes the circuit in the vehicle. The hoist motor will thus be operated in the manner above described to raise or lower the lift forks 115, and subject to forward and reverse action of the steering control since lift motor has replaced steering motor due to action of relay 127.

It should be understood that instead of a hoisting device, any other conventional device may be operated by the third motor controlled by the second relay. It will be seen that the invention consists in the use of more than two motors consecutively on a single pair of conductors, each motor except the first having a relay associated with it to interrupt current to a previously connected circuit and insert its own motor in the circuit, each relay operating in response to a predetermined increased voltage.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In remotely controlled electrically propelled vehicle apparatus including a platform having two series of spaced conductors thereon, and an electrically propelled vehicle adapted for movement over the platform, a drive motor on the vehicle, and electric pick-up means on the vehicle for contact with each series of conductors, and an electric circuit connected to said conductors, the improvemen characterized by a steering motor on the vehicle, and a relay on the vehicle which determines which motor is to be electrically connected to said pick-up means in response to the amount of current the relay receives from said conductors, whereby the vehicle may be moved in any direction over said platform.

2. In remotely controlled electrically propelled vehicle apparatus as defined in claim 1, two control means for changing the voltage delivered to said conductors.

3. In remotely controlled electrically propelled vehicle apparatus as defined in claim 2, one of said control means comprising means for changing the polarity of said electric circuit to said conductors.

4. In remotely controlled electrically propelled vehicle apparatus including a platform having two series of spaced conductors thereon, and an electrically propelled vehicle adapted for movement over the platform, a drive motor on the vehicle, and electric pick-up means on the vehicle for contact with each series of conductors, and an electric circuit connected to said conductors, the improvement characterized by at least two additional motors on the vehicle, one of said additional motors being a steering motor, and a relay on the vehicle associated with each additional motor to interrupt current to a previously connected motor and connect its own motor to the pick-up means, each relay operating in response to a predetermined value of current, whereby the vehicle may be moved in any direction over said platform.

5. In remotely controlled electrically propelled vehicle apparatus as defined in claim 4, a plurality of control means for changing the voltage delivered to said conductors.

6. Remotely controlled electrically propelled vehicle apparatus as defined in claim 5, in which at least two of the control means for changing the voltage include means for changing the polarity of said electric circuit to said conductors.

7. Remotely controlled electrically propelled vehicle apparatus as defined in claim 6, in which one of the control means for changing the voltage includes a resistor in said electric circuit and a shunting switch for said resistor.

8. Remotely controlled electrically propelled vehicle apparatus as defined in claim 5, in which one of the control means for changing the voltage includes means for changing the polarity of said electric circuit to said conductors, and another of the control means includes a resistor in said electric circuit and a shunting switch for said resistor.

9. In a platform for an electrically propelled vehicle having pick-up means including tooth means and surface slide means, and traction wheels, said platform comprising a sheet of conductor material having parallel grooves therein and spaced rows of apertures in the high points between said grooves, a second sheet of conductor material below said first mentioned sheet, insulation means between said sheets, spaced rows of projections upon said second sheet located through the apertures in the first sheet, an electric circuit connected to said conductor sheets, said parallel grooves providing conductor means for contact by said tooth means, said spaced rows of projections providing conductor means for contact by said surface slide means, the invention characterized by a film of paint upon the high points of said first named sheet of conductor material insulating the same from said pick-up means, and providing traction for said traction wheels.

10. In remotely controlled electrically propelled vehicle apparatus including a platform having two series of spaced parallel conductors thereon, at least one series of which are located in parallel grooves in the platform, and an electrically propelled vehicle adapted for movement over the platform, a drive motor on the vehicle, electric pick-up means on the vehicle for contact with each series of conductors, said pick-up means being electrically connected to the motor, and an electric circuit connected to said conductors, the improvement characterized by a steering motor on the vehicle, a relay on the vehicle, the relay including a coil, an armature and contacts operated thereby, said relay coil requiring a higher voltage than said first named motor, said relay contacts controlling selective connection of each motor to the pick-up means, and means for raising the voltage in said electric circuit to operate said relay to disconnect the drive motor and connect the steering motor in circuit to the pick-up means, whereby the vehicle may be moved in any direction over said platform.

11. In remotely controlled electrically propelled vehicle apparatus as defined in claim 10, in which the means for raising the voltage comprises means for changing the polarity in the circuit to said conductors.

References Cited by the Examiner
UNITED STATES PATENTS

| | | | |
|---|---|---|---|
| 2,768,697 | 10/1956 | Shotwell | 180—2 |
| 2,832,427 | 4/1958 | Shotwell | 180—2 |
| 3,095,937 | 7/1963 | Durand | 180—2 |

LEO FRIAGLIA, *Primary Examiner.*